US010516999B1

(12) United States Patent
Desai

(10) Patent No.: US 10,516,999 B1
(45) Date of Patent: Dec. 24, 2019

(54) SYSTEMS AND METHODS FOR SELF-ORGANIZING NETWORK PROVISIONING BASED ON SIGNAL PATH IMAGE

(71) Applicant: Verizon Patent and Licensing Inc., Arlington, VA (US)

(72) Inventor: Ishita Desai, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/157,603

(22) Filed: Oct. 11, 2018

(51) Int. Cl.
*H04W 16/18* (2009.01)
*H04W 24/02* (2009.01)
*H04W 16/28* (2009.01)
*H04N 5/225* (2006.01)
*G06K 9/00* (2006.01)
*H04W 84/18* (2009.01)

(52) U.S. Cl.
CPC ........ *H04W 16/18* (2013.01); *G06K 9/00637* (2013.01); *H04N 5/2253* (2013.01); *H04W 16/28* (2013.01); *H04W 24/02* (2013.01); *H04W 84/18* (2013.01)

(58) Field of Classification Search
CPC ..... H04W 16/18; H04W 16/28; H04W 24/02; H04W 84/18; G06K 9/00637; H04N 5/2253
See application file for complete search history.

(56) References Cited

U.S. PATENT DOCUMENTS

| | | | | |
|---|---|---|---|---|
| 2017/0279955 | A1* | 9/2017 | Togashi | H01Q 1/273 |
| 2018/0192297 | A1* | 7/2018 | Chadaga | H04W 16/20 |
| 2018/0234977 | A1* | 8/2018 | Yasukawa | H04W 72/0406 |
| 2018/0284217 | A1* | 10/2018 | Takeuchi | H01Q 1/22 |
| 2018/0317097 | A1* | 11/2018 | Senior | H04W 16/26 |
| 2019/0051150 | A1* | 2/2019 | Anderson | G08G 1/005 |
| 2019/0098220 | A1* | 3/2019 | Liv | |
| 2019/0261193 | A1* | 8/2019 | Torsner | G06T 7/20 |
| 2019/0268780 | A1* | 8/2019 | Sarkar | H04W 16/18 |

* cited by examiner

*Primary Examiner* — Khawar Iqbal

(57) ABSTRACT

A computer system may include a memory storing instructions and processor configured to execute the instructions to obtain image data relating to a path of Fifth Generation (5G) New Radio (NR) wireless signals sent or received by a base station; analyze the obtained image data to identify sources of interference for the 5G NR wireless signals; and estimate a quality of the 5G NR wireless signals along the path based on the identified sources of interference. The processor may be further configured to determine that the estimated quality of the 5G NR wireless signals is less than a quality threshold; generate a recommendation for a self-organizing network (SON) action relating to the base station, based on determining that the estimated quality of the 5G NR wireless signals is less than the quality threshold; and perform the SON action relating to the base station based on the generated recommendation.

20 Claims, 12 Drawing Sheets

SYSTEMS AND METHODS FOR SELF-ORGANIZING NETWORK PROVISIONING BASED ON SIGNAL PATH IMAGE

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices. For example, a base station may service a large number of wireless devices. Wireless signals sent or received by the base station, however, may experience various forms of interference.

DETAILED DESCRIPTION OF PREFERRED EMBODIMENTS

Figure 1:
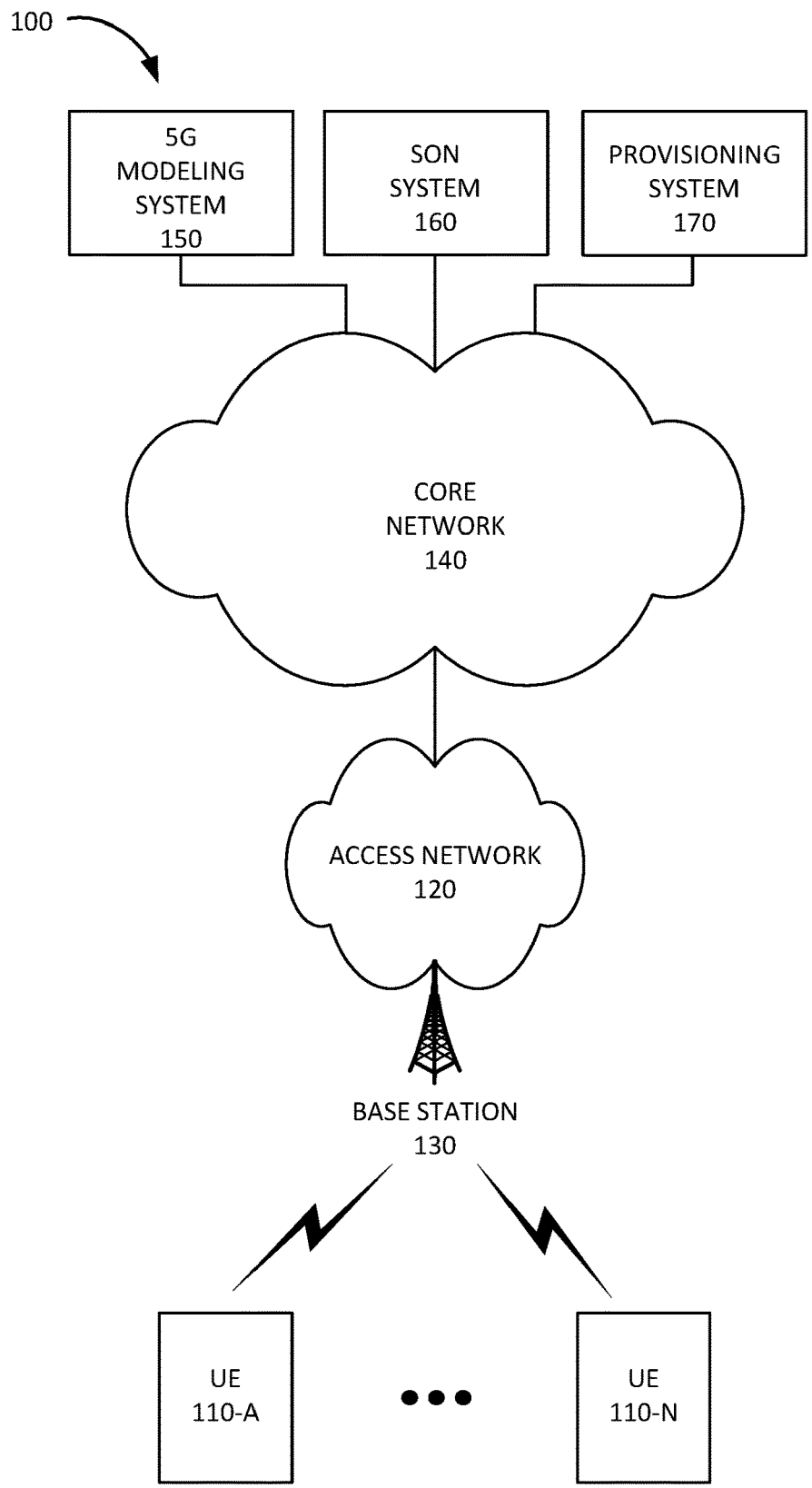
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks may become more complicated. One way in which wireless access networks are continuing to become more complicated is by incorporating various aspects of next generation networks like $5^{th}$ generation (5G) mobile networks, such as high frequency bands and a large number of antennas. 5G New Radio (NR) mm-wave technology may provide significant improvements in bandwidth and/or latency over previous wireless network technology, such as Fourth Generation (4G) wireless technology. Furthermore, coverage and signal quality may be improved using multiple-input and multiple-output (MIMO) adaptive antenna arrays. Additionally, user equipment (UE) devices may also include multiple antennas to improve spectral efficiency.

The antenna arrays may point to multiple users simultaneously using spatial multiplexing and/or beam forming. The use of mm-wave bands and large antenna arrays may require better directional resolution for accurate beam forming. For example, while phased arrays may include a number of predefined antenna array settings that may be selected to perform beam forming, such settings may not be adequate for 5G beam forming. Thus, adaptive antenna arrays that can be adjusted in real time to any available setting (e.g., each antenna element may be individually set to point in a particular direction) may be used. However, determining an optimal antenna array setting may pose significant challenges.

An optimum antenna array setting at a base station, for a UE device, may form an antenna beam toward the location of the UE device in such a way that the UE device receives signals at the maximum available signal power and/or quality, while minimizing interference to other UE devices serviced by a base station sector associated with an antenna array wireless transceiver. Thus, if the base station slice services k UE devices, the antenna array may form k simultaneous antenna beams. Beam forming of such k simultaneous antenna beams may be easier in line of sight (LOS) scenarios in which each antenna beam points directly toward the location of a particular UE device.

However, wireless signals at the mm wave frequency range used by 5G may not have strong multipath propagation and fading may occur as a result of scattering from terrain objects, such as buildings, walls, structures (e.g., an overpass, a bridge, construction equipment, a billboard, etc.), foliage, mountains, vehicles, etc.; reflection from bodies of water; ionospheric reflection and/or refraction; atmospheric attenuation and scattering caused by air masses of different densities, precipitation, environmental factors, etc.; and/or other types of signal interference. Therefore, LOS signal paths that do not include significant sources of interference may be preferable, because signal paths may be associated with a high signal quality and therefore good user experience.

Self-organizing networks (SONs) (sometimes also referred to as "self-optimizing networks") enable automated optimizations of wireless networks and may be deployed at a scale to manage wireless networks, such as 4G and 5G wireless networks. SON functions may be used to enable discovery and optimization of base station neighbor lists, modification of antenna tilts or directions to improve coverage or capacity, changes to handoff parameters to reduce handover drops, adjustments to transmission power, and/or other types of parameters whose optimizations previously required laborious manual procedures.

SON functions may be carried out by obtaining various metrics, also referred to as key performance indicators (KPIs), across a large number of base stations and user equipment (UE) devices, to perform autonomous analysis on the obtained metrics. The result of the analysis may indicate a change in one or more parameters of a base station to optimize (i.e., improve) the functioning of the base station in response to the changing conditions.

Implementations described herein relate to 5G SON adjustments and provisioning based on signal path image data. A computer system may be configured to: obtain image data relating to a path of 5G NR wireless signals sent or received by a base station; analyze the obtained image data to identify sources of interference for the 5G NR wireless signals; and estimate a quality of the 5G NR wireless signals along the path based on the identified sources of interference.

The computer system may generate provisioning recommendations based on the estimated quality of the 5G NR wireless signals. For example, the computer system may be configured to determine whether the estimated quality of the 5G NR wireless signals is greater than a quality threshold and generate a provisioning recommendation for a SON action relating to the base station, based on determining that the estimated quality of the 5G NR wireless signals is greater than the quality threshold. The provisioning recommendation may include, for example, information identifying whether a customer location along the path of 5G NR wireless signals should be provisioned for 5G NR wireless service. In some implementations, the computer system may be configured to identify a particular address associated with the path. For example, if the path of 5G NR wireless signals is directed toward a multi-dwelling unit (e.g., an apartment building), the computer system may identify a particular dwelling unit associated with the path based on the image data.

The computer system may generate SON recommendations based on the estimated quality of the 5G NR wireless signals. For example, the computer system may be configured to determine whether the estimated quality of the 5G NR wireless signals is less than a quality threshold and generate a recommendation for a SON action relating to the base station, based on determining that the estimated quality of the 5G NR wireless signals is less than the quality threshold. A SON system may then perform the SON action relating to the base station based on the generated recommendation. The SON action may include, for example, adjusting one or more antenna tilt parameters, one or more handover parameters, one or more coverage optimization parameters, one or more power distribution parameters, and/or one or more load balancing parameters.

In some implementations, the image data may include overhead image data of an area that includes the base station. For example, the image data may include satellite images of the area that includes the base station. Additionally, or alternatively, the image data may be obtained using a camera mounted on or aligned with an antenna array associated with the base station. For example, the camera may be aligned in the same direction as an antenna beam generated by the antenna array and may capture an image in the LOS path associated with the generated antenna beam.

Analyzing the obtained image data to identify sources of interference for the 5G NR wireless signals may include using a machine learning model trained to identify, in an image, sources of interference for the 5G NR wireless signals. The identified sources of interference may include, for example, buildings, walls, other types of structures, foliage, vehicles, precipitation, and/or other sources of interference. Furthermore, a machine learning model may be trained to identify windows or other openings in buildings, as windows or openings may indicate a signal path associated with good 5G wireless signal quality.

In some embodiments, a first machine learning model may be trained to identify sources of interference for 5G NR wireless signals in overhead images and a second machine learning model may be trained to identify sources of interference for 5G NR wireless signals in LOS images obtained by a camera associated with an antenna array. Furthermore, a third machine learning model may be trained to determine an estimated signal quality based on the identified sources of interference in overhead images and a fourth machine learning model may be trained to determine an estimated signal quality based on the identified sources of interference in LOS images obtained by the camera.

FIG. 1 is a diagram of an exemplary environment 100 in which the systems and/or methods described herein may be implemented. As shown in FIG. 1, environment 100 may include user equipment (UE) devices 110-A to 110-N (referred to herein collectively as "UE devices 110" and individually as "UE device 110"), an access network 120, a core network 140, a 5G modeling system 150, a SON system 160, and a provisioning system 170.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a set-top box or a digital media player (e.g., Apple TV, Google Chromecast, Amazon Fire TV, etc.); a smart television; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), a type of M2M communication standardized by the $3^{rd}$ Generation Partnership Project (3GPP), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Access network 120 may provide access to core network 140 for UE devices 110. Access network 120 may enable UE device 110 to connect to core network 140 for mobile telephone service, Short Message Service (SMS) message service, Multimedia Message Service (MIMS) message service, Internet access, cloud computing, and/or other types of data services.

Access network 120 may establish a connection between UE device 110 and core network 140. For example, access network 120 may establish an Internet Protocol (IP) connection between UE device 110 and core network 140. Furthermore, access network 120 may enable UE device 110 to communicate with an application server, and/or another type of device, located in core network 140 using a communication method that does not require the establishment of an IP connection between UE device 110 and core network 140, such as, for example, Data over Non-Access Stratum (DoNAS).

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a 5G access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include a base station 130. Base station 130 may service UE devices 110-A to 110-N. In other words, UE devices 110-A to 110-N may be located within the geographic area serviced by base station 130. Base station 130 may include a 4G base station (e.g., an eNodeB) and/or a 5G base station (e.g., a gNodeB). Base station 130 may include one or more cells that include devices and/or components configured to enable wireless communication with UE devices 110. For example, each cell may include a radio frequency (RF) transceiver facing a particular direction.

Core network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of core network 140 may be managed by a provider of communication services that also manages access network 120 and/or UE device 110. Core network 140 may allow the delivery of Internet Protocol (IP) services to UE device 110, and may interface with other external networks. Core network 140 may include one or more server devices and/or network devices, or other types of computation or communication devices. In some implementations, core network 140 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

5G modeling system 150 may include one or more devices, such as computer devices and/or server devices, which perform modeling of 5G wireless signal quality based on image data associated with particular paths of 5G wireless signals. For example, 5G modeling system 150 may include one or more trained machine learning models to identify sources of interference for 5G NR wireless signals in overhead images and sources of interference for 5G NR wireless signals in LOS images obtained by a camera associated with an antenna array, to determine an estimated 5G wireless signal quality based on the identified sources of interference in overhead images, and/or to determine an estimated 5G wireless signal quality based on the identified sources of interference in LOS images obtained by the camera. 5G modeling system 150 may generate a recommendation for a SON action based on estimated 5G wireless signal quality for a signal path and send the SON action recommendation to SON system 150. Furthermore, 5G modeling system 150 may generate a provisioning recommendation based on estimated 5G wireless signal quality for a signal path and send the provisioning recommendation to provisioning system 170.

SON system 160 may include one or more devices, such as computer devices and/or server devices, which perform part of self-organization functions for access network 120 and/or core network 140. SON system 150 may obtain information relating to UE devices 110 and/or base stations 130 and may perform SON actions based on the obtained information. For example, SON system 150 may send an instruction to base station 130, such as, for example, an instruction to adjust one or more antenna tilt parameters, adjust one or more handover parameters, adjust one or more coverage optimization parameters, adjust one or more power distribution parameters, adjust one or more load balancing parameters, and/or perform another type of adjustment. SON system 160 may receive a recommendation to perform a SON adjustment from 5G modeling system 150 (e.g., to adjust an antenna beam to avoid a source of signal interference) and may select to perform the recommended SON adjustment.

Provisioning system 170 may include one or more devices, such as computer devices and/or server devices, which provision services for customers. Provisioning system 170 may configure particular network devices for particular services and/or may generate instructions to dispatch a technician to configure a particular service. Furthermore, provisioning system 170 may generate a recommendation for a particular customer. For example, when 5G modeling system 150 provides a recommendation to provisioning system 170 that a particular signal path is appropriate for 5G wireless signals, provisioning system 170 may identify a customer associated with the particular signal path and may generate a recommendation to the customer for 5G wireless service.

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100. For example, in some implementations, 5G modeling system 150 may be included in SON system 160 or vice versa.

Figure 2:
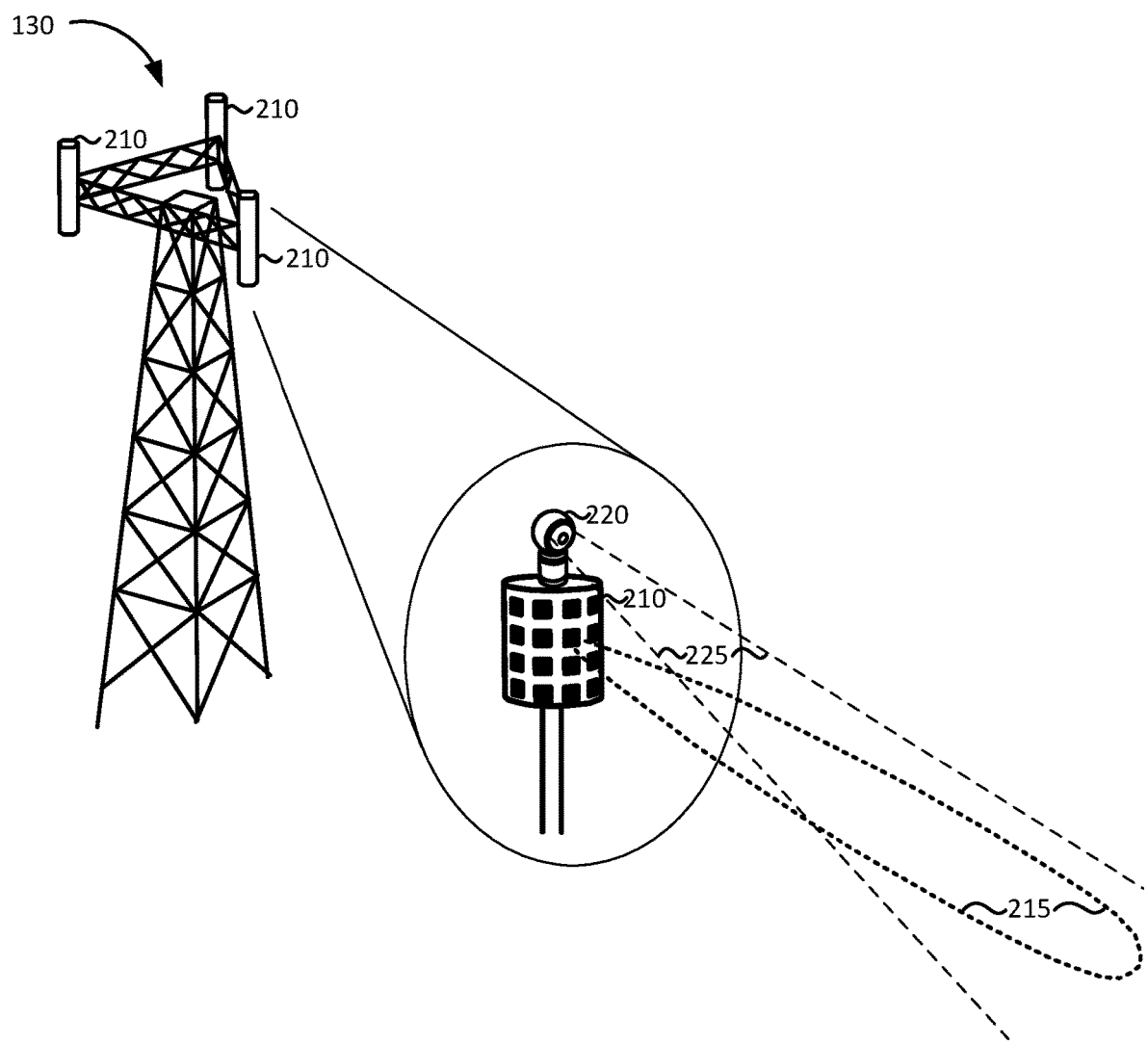
FIG. 2 illustrates exemplary components of the base station of FIG. 1 according to an implementation described herein.

FIG. 2 illustrates exemplary components of base station 130 according to an implementation described herein. As shown in FIG. 2, base station 130, which covers three 120° sectors, may include one or more antenna arrays 210. Antenna array 210 may include an array of controllable antenna elements configured to send and receive 5G NR wireless signals. The antenna elements may be digitally controllable to electronically tilt or steer an antenna beam in a vertical direction and/or horizontal direction. In some implementations, the antenna elements may additionally be controllable via mechanical tilting or steering using one or more actuators associated with each antenna element. The base station sector associated with antenna array 210 may serve k UE devices 110 and antenna array 210 may simultaneously generate k antenna beams.

Antenna array 210 may include a camera 220. Camera 220 may be controllable via one or more motors to point, align, and/or focus in a particular direction associated with antenna array 210. Camera 220 may be controlled by base station 130 to capture images while pointing in a substantially same direction as an antenna beam generated by antenna array 210. For example, if antenna array 210 generates an antenna beam 215, camera 220 may be controlled to capture an image in direction 225, along the path of antenna beam 215. Furthermore, camera 220 may be controlled to rotate a full 360° to capture images in each direction away from base station 130 (e.g., at every 5°, etc.). Thus, camera 220 may be used to identify directions that do not include sources of interference and that experience good propagation of 5G wireless signals.

Although FIG. 2 shows exemplary components of base station 130, in other implementations, base station 130 may include fewer components, different components, differently arranged components, or additional functional components than depicted in FIG. 2. Additionally, or alternatively, one or more components of base station 130 may perform functions described as being performed by one or more other components of base station 130. For example, in other implementations, camera 220 may be mounted on the tower of base station 130 and may be controllable to be aligned with a particular antenna array 210. Thus, a single camera 220 may be used to cover all antenna arrays 210 associated with base station 130.

Figure 3:
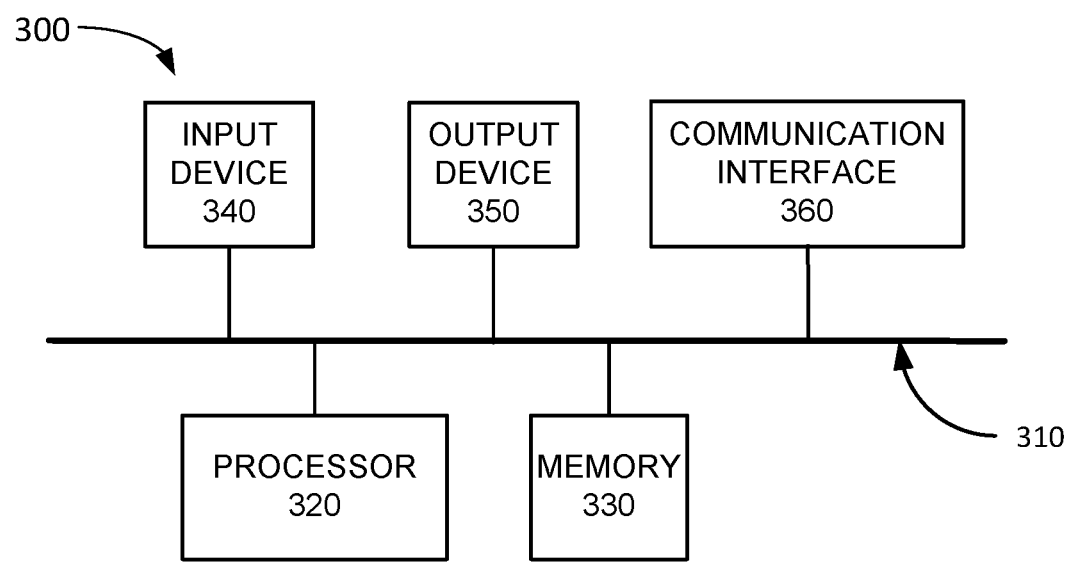
FIG. 3 is a diagram illustrating exemplary components of a device that may be included in a component of FIG. 1 according to an implementation described herein.

FIG. 3 is a diagram illustrating exemplary components of device 300 according to an implementation described herein. UE 110, base station 130, 5G modeling system 150, SON system 160, provisioning system 170, antenna array 210, and/or camera 220 may each include a computer system that includes one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to 5G SON adjustments and provisioning based on signal path image data. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
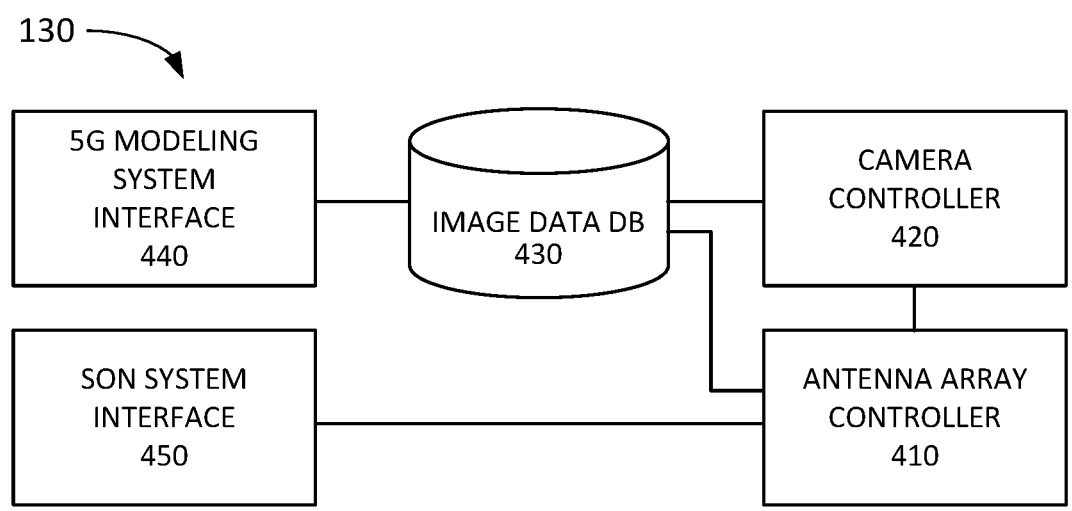
FIG. 4 is a diagram illustrating exemplary functional components of the base station of FIG. 1 according to an implementation described herein.

FIG. 4 is a diagram illustrating exemplary functional components of base station 130. The functional components of base station 130 may be implemented, for example, via processor 320 executing instructions from memory 330. Alternatively, some or all of the functional components of base station 130 may be implemented via hard-wired circuitry. As shown in FIG. 4, base station 130 may include an antenna array controller 410, a camera controller 420, an image data database (DB) 430, a 5G modeling system interface 440, and a SON system interface 450.

Antenna array controller 410 may control antenna array 210 to generate one or more antenna beams pointing in particular directions. Camera controller 420 may control camera 220 to capture images while pointing and/or focusing in a particular direction. For example, camera controller 420 may control camera 220 to point and/or focus in a direction associated with an antenna beam generated by antenna array 210 and to capture images while pointing in the direction associated with the antenna beam. Camera controller 420 may store the captured images in image data DB 430.

5G modeling system interface 440 may be configured to communicate with 5G modeling system 150. For example, 5G modeling system interface 440 may provide stored images from image data DB 430 to 5G modeling system 150. SON system interface 450 may be configured to communicate with SON system 160. For example, SON system interface 450 may receive an instruction from SON system 160 to perform a particular SON action, such as an instruction to adjust one or more antenna tilt parameters for a particular antenna beam, adjust one or more handover parameters, adjust one or more coverage optimization parameters, adjust one or more power distribution parameters, and/or adjust one or more load balancing parameters.

Although FIG. 4 shows exemplary functional components of base station 130, in other implementations, base station 130 may include fewer functional components, different functional components, differently arranged functional components, or additional functional components than depicted in FIG. 4. Additionally, or alternatively, one or more functional components of base station 130 may perform functions described as being performed by one or more other functional components of base station 130. For example, while the functional components of FIG. 4 are described as being implemented in base station 130, in other implementations, some or all of the functional components of FIG. 4 may be implemented in another component of access network 120 or core network 140. For example, some or all of the functional components of FIG. 4 may be implemented in a cloud computing center, a mobile edge computing (MEC) architecture extended to base station 130, a network node in access network 120, and/or a another type of device or component of access network 120 and/or core network 140.

Figure 5:
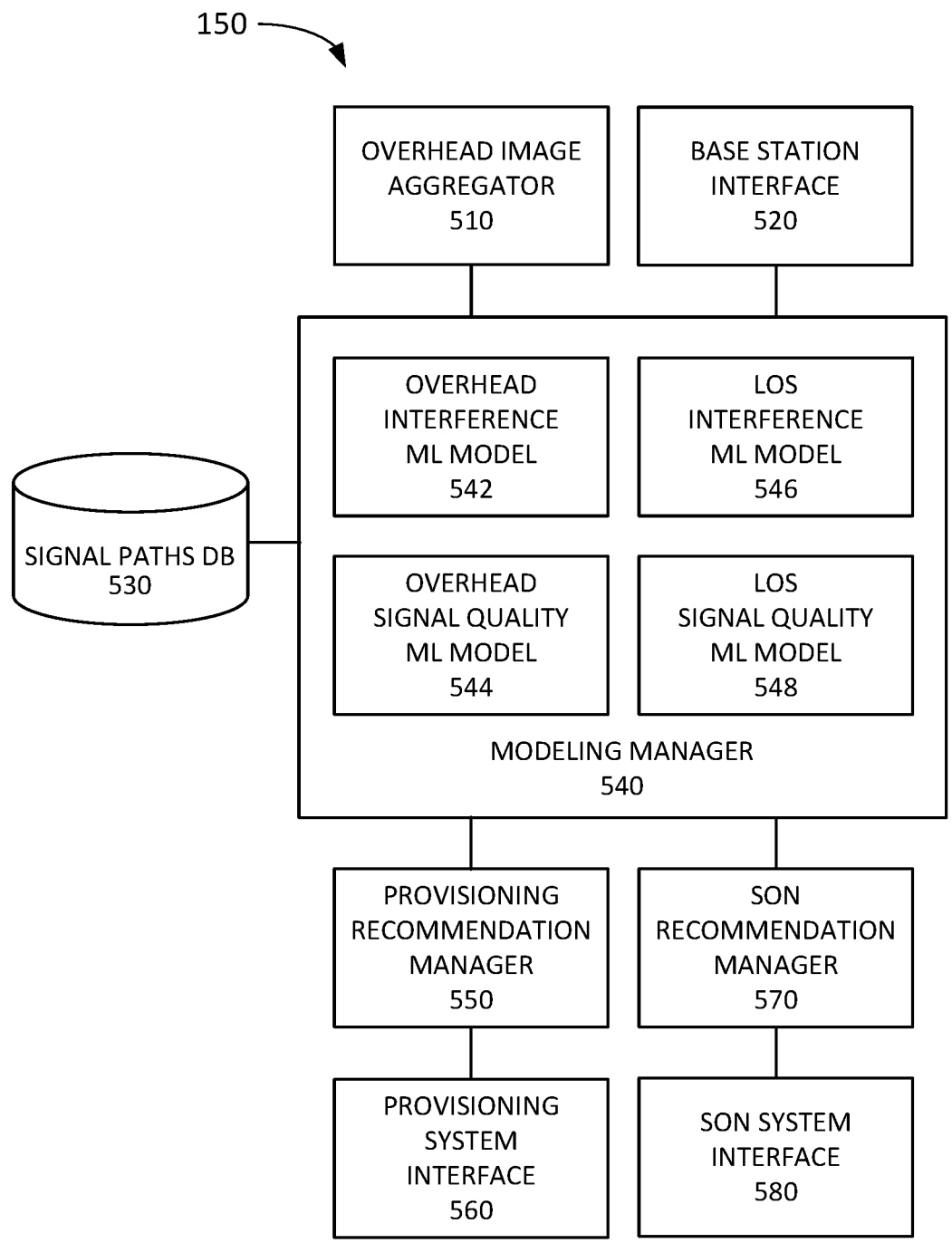
FIG. 5 is a diagram illustrating exemplary functional components of the Fifth Generation (5G) modeling system of FIG. 1 according to an implementation described herein.

FIG. 5 is a diagram illustrating exemplary functional components of 5G modeling system 150. The functional components of 5G modeling system 150 may be implemented, for example, via processor 320 executing instructions from memory 330. Alternatively, some or all of the functional components of 5G modeling system 150 may be implemented via hard-wired circuitry. As shown in FIG. 5, 5G modeling system 150 may include an overhead image aggregator 510, a base station interface 520, a signal paths DB 530, a modeling manager 540, a provisioning recommendation manager 550, a provisioning system interface 560, a SON recommendation manager 570, and a SON system interface 580.

Overhead image aggregator 510 may aggregate overhead images from one or more sources. For example, overhead image aggregator 510 may obtain satellite images and/or street view images of an area that includes base station 130 from a mapping service. As another example, overhead image aggregator 510 may dispatch one or more aerial drones with cameras to obtain overhead images of the area that includes base station 130.

Base station interface 520 may be configured to communicate with base station 130. For example, base station interface 520 may obtain image data captured by camera 220 and stored in image data DB 430. Signal paths DB 530 may store information relating to signal paths associated with base stations 130. Exemplary information that may be stored in signal paths DB 530 is described below with reference to FIG. 6.

Modeling manager 540 may use one or more machine learning models to identify sources of interference in an image associated with a 5G signal path and/or to estimate 5G signal quality associated with the 5G signal path. In some implementations, the machine learning models may include, for example, a deep learning artificial neural network, such as a convolutional neural network (CNN). In other implementations, the machine learning models may include other types of models, such as, for example, a deep learning model for object detection, an image segmentation model, a logistic regression classifier, a linear discriminant analysis (LDA) classifier, a quadratic linear discriminant analysis (QDA) classifier, a decision tree classifier, a naïve Bayes classifier, a K-nearest neighbors classifier, a support vector machine (SVM) classifier, tree based (e.g., a random forest) classifier using Euclidian and/or cosine distance methods, a maximum entropy classifier, a kernel density estimation classifier, a principal component analysis (PCA) classifier, and/or another type of classifier. Modeling manager 540 may include an overhead interference machine learning (ML) model 542, an overhead signal quality ML model 544, a LOS interference ML model 546, and a LOS signal quality ML model 548.

Overhead interference ML model 542 may be trained to identify sources of interference for 5G wireless signals in overhead images that include an image of base station 130. For example, overhead interference ML model 542 may be trained to identify buildings, walls, structures, foliage, vehicles, wind, precipitation, and/or other sources of interference. Furthermore, overhead interference ML model 542 may be trained to identify areas that may improve the propagation of 5G wireless signals, such as windows in buildings. In some implementations, overhead interference ML model 542 may be trained using supervised learning using a training set that includes images with labeled sources of interference. In other implementations, overhead interference ML model 542 may be trained using unsupervised learning.

Overhead signal quality ML model 544 may estimate a signal quality for a particular signal path in an overhead image based on sources of interference identified by overhead interference ML model 542. For example, overhead signal quality ML model 544 may classify the signal path into one a particular signal quality class, such a good or poor signal quality class, a signal quality class on a numerical grade from a highest signal quality to lowest signal quality, and/or another type of signal quality designation. Each particular type of interference may be associated with a change in 5G signal strength. For example, foliage, such as trees, may reduce the 5G signal strength by a particular amount, while building or walls may block 5G signals (e.g., reduce the 5G signal strength to a very low number) unless the signal path encounters a window.

LOS interference ML model 546 may be trained to identify sources of interference for 5G wireless signals in LOS images obtained by camera 220 of base station 130. For example, LOS interference ML model 546 may be trained to identify buildings, walls, foliage, vehicles, wind, precipitation, and/or other sources of interference. Furthermore, LOS interference ML model 546 may be trained to identify areas that may improve the propagation of 5G wireless signals, such as windows or other types of openings in buildings. In some implementations, LOS interference ML model 546 may be trained using supervised learning using a training set that includes images with labeled sources of interference. In other implementations, LOS interference ML model 546 may be trained using unsupervised learning.

LOS signal quality ML model 548 may estimate a signal quality for a particular signal path in an overhead image based on sources of interference identified by LOS interference ML model 546. For example, LOS signal quality ML model 548 may classify the signal path into one a particular signal quality class, such a good or poor signal quality class, a signal quality class on a numerical grade from a highest signal quality to lowest signal quality, and/or another type of signal quality designation.

Modeling manager 540 may include other types of models. For example, modeling manager 540 may include an ML model for height determination. The ML model for height determination may analyze obtained images to determine the height of a house, the height of a roof, the height of a window or other type of opening in a building or wall, the height of a tree or other type of foliage, and/or make other types of height determinations. For example, the ML model for height determination may be used to detect, over a period of time, that a particular tree has grown above a threshold height and SON recommendation manager 570 may generate a recommendation to adjust a particular antenna beam, and/or make another type of SON adjustment in response.

Provisioning recommendation manager 550 may generate a provisioning recommendation for a particular signal path based on information determined by modeling manager 540 and stored in signal paths DB 530. For example, provisioning recommendation manager 550 may recommend that a particular signal path be provisioned for 5G wireless service based on the estimated 5G signal quality for the particular signal path. Provisioning system interface 560 may be configured to communicate with provisioning system 170. For example, provisioning system interface 560 may provide a provisioning recommendation generated by provisioning recommendation manager 550 to provisioning system 170.

SON recommendation manager 570 may generate a SON action recommendation for a particular signal path based on information determined by modeling manager 540 and stored in signal paths DB 530. For example, SON recommendation manager 570 may recommend that a particular SON adjustment be performed for a particular signal path. SON system interface 580 may be configured to communicate with SON system 160. For example, SON system interface 580 may provide a SON action recommendation generated by SON recommendation manager 570 to SON system 160.

Although FIG. 5 shows exemplary functional components of 5G modeling system 150, in other implementations, 5G modeling system 150 may include fewer functional components, different functional components, differently arranged functional components, or additional functional components than depicted in FIG. 5. Additionally, or alternatively, one or more functional components of 5G modeling system 150 may perform functions described as being performed by one or more other functional components of 5G modeling system 150.

Figure 6:
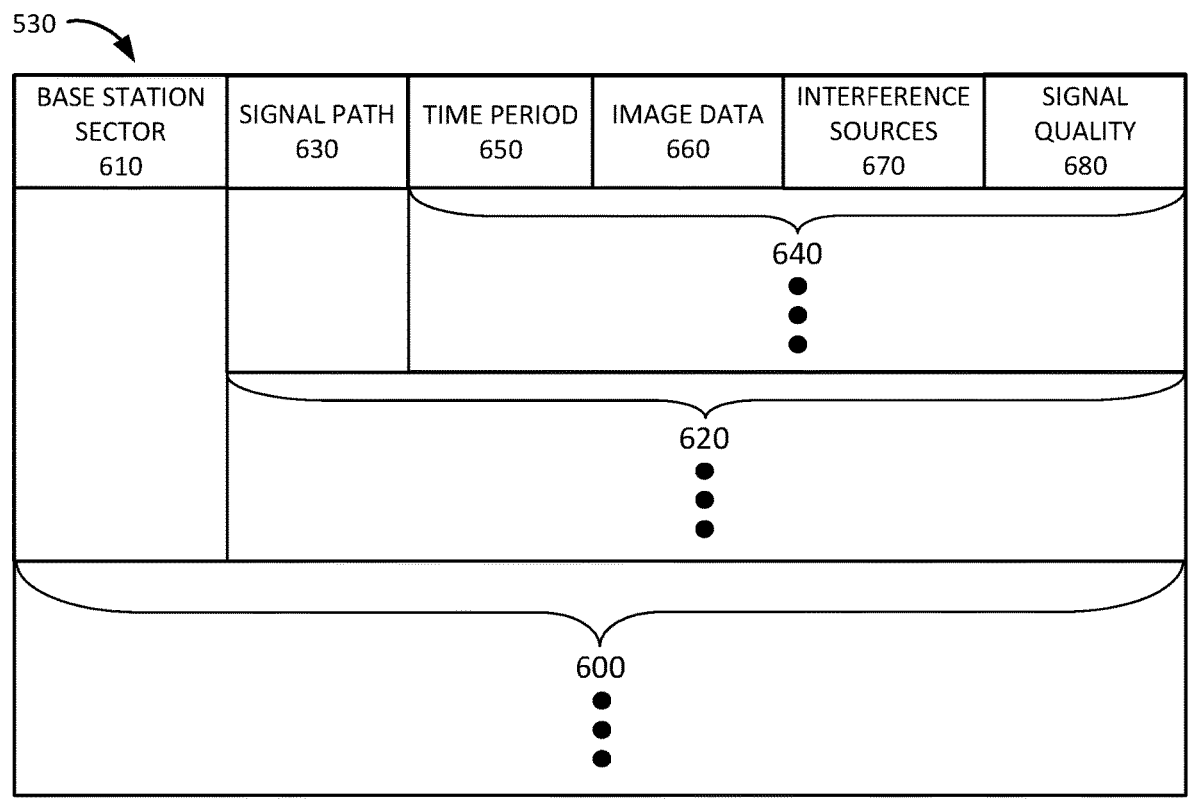
FIG. 6 is a diagram illustrating exemplary components of the signal paths database of FIG. 5 according to an implementation described herein.

FIG. 6 is a diagram illustrating exemplary components of the signal paths DB 530 according to an implementation described herein. As shown in FIG. 6, signal paths DB 530 may include one or more base station sector records 610. Each base station sector record 610 may store information relating to a particular base station sector.

Base station sector record 610 may include a base station sector field 610 and one or more signal path records 620. Base station sector field 610 may store information identifying a particular base station sector of base station 130. Each signal path record 620 may store information associated with a particular signal path. Signal path record 620 may include a signal path field 630 and one or more time period records 640. Signal path field 630 may identify a particular signal path from the particular base station sector. The particular signal path may be identified, for example, by azimuth and elevation.

Each time period record 640 may store image data associated with the signal path for a particular time period. Time period record 640 may include a time period field 650, an image data field 660, an interference sources field 670, and a signal quality field 680. Time period field 650 may store information identifying a particular time period. For example, time period field 650 may include a timestamp associated with an image stored in image data 660. Image data field 660 may store one or more images associated with the particular time period. As an example, image data field 660 may store an image captured by camera 220. As another example, image data field 660 may store an overhead image obtained by overhead image aggregator 510.

Interference sources field 670 may store information identifying sources of interference for 5G wireless signals identified in the images stored in image data field 660. For example, interference sources field 670 may store an image that has undergone segmentation and/or labeling to identify the sources of interference. Signal quality field 680 may store information identifying an estimated signal quality associated with the particular signal path during the particular time period based on the identified sources of interference. For example, signal quality field 680 may store a signal quality value on a scale that ranges from a lowest signal quality to a highest signal quality.

Although FIG. 6 shows exemplary components of signal paths DB 530, in other implementations, signal paths DB 530 may include fewer components, different components, additional components, or differently arranged components than depicted in FIG. 6.

Figure 7:
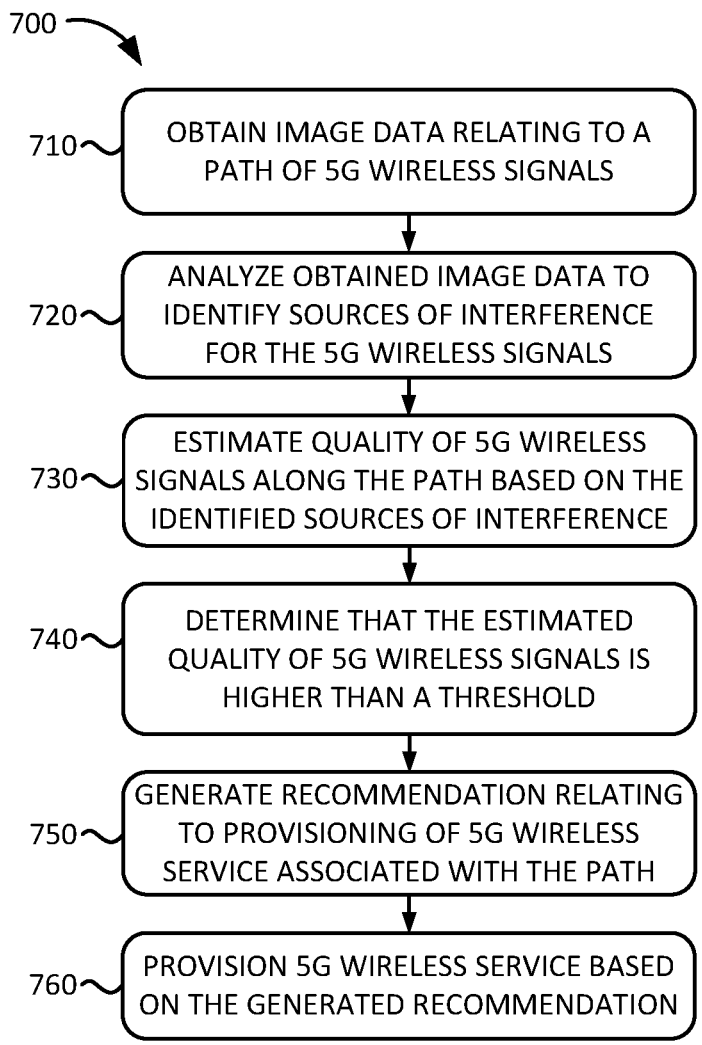
FIG. 7 is a flowchart of a process for using image data to generate a provisioning recommendation according to an implementation described herein.

FIG. 7 is a flowchart of a process for using image data to generate a provisioning recommendation according to an implementation described herein. In some implementations, the process of FIG. 7 may be performed by 5G modeling system 150. In other implementations, some or all of the process of FIG. 7 may be performed by another device or a group of devices separate from 5G modeling system 150.

The process of FIG. 7 may include obtaining image data relating to a path of 5G wireless signals (block 710). As an example, overhead image aggregator 510 may obtain satellite images of an area that includes base station 130 from a mapping service. As another example, camera 220 may capture LOS images associated with a signal path. The obtained image data may be analyzed to identify sources of interference for the 5G wireless signals (block 720) and the quality of 5G wireless signals along the path may be estimated based on identified sources of interference (block 730). For example, modeling manager 540 may use the obtained image data to identify sources of interference for particular signal paths. With respect to an overhead image, modeling manager 540 may trace a signal path from a location of base station 130 in the image towards the periphery of the image at a particular azimuth reading and may determine whether the traced signal path meets any sources of interference identified by overhead interference ML model 542. Modeling manager 540 may trace multiple signal paths in the overhead image, such as, for example, tracing a signal path at every 5°, every 10°, etc.

With respect to a LOS image, modeling manager 540 may also select multiple signal paths by selecting an azimuth value and an elevation value, identifying a location in the LOS image corresponding to the selected azimuth value and elevation value, and determine whether any sources of interference were identified at the identified location in the LOS image. Modeling manager 540 may then calculate the estimated signal strength along the path based on the identified sources of interference.

A determination may be made that the estimated quality of 5G wireless signals is higher than a threshold (block 740) and a recommendation relating to provisioning of 5G wireless service associated with the path may be generated (block 750). For example, provisioning recommendation manager 550 may determine that the estimated 5G signal quality is higher than a provisioning recommendation threshold and may send a recommendation to provisioning system 170 to recommend the path for 5G wireless service. The path may be identified to provisioning system 170 by, for example, sets of GPS coordinates, by base station 130 and azimuth and elevation values, and/or using another technique.

The 5G wireless service may be provisioned based on the generated recommendation (block 760). For example, provisioning system 170 may identify a customer associated with the path and may generate a recommendation that is provided to the customer. The recommendation may indicate to the customer that the customer is a good candidate for 5G wireless service due to an estimated high signal strength at the customer's location.

Figure 8:
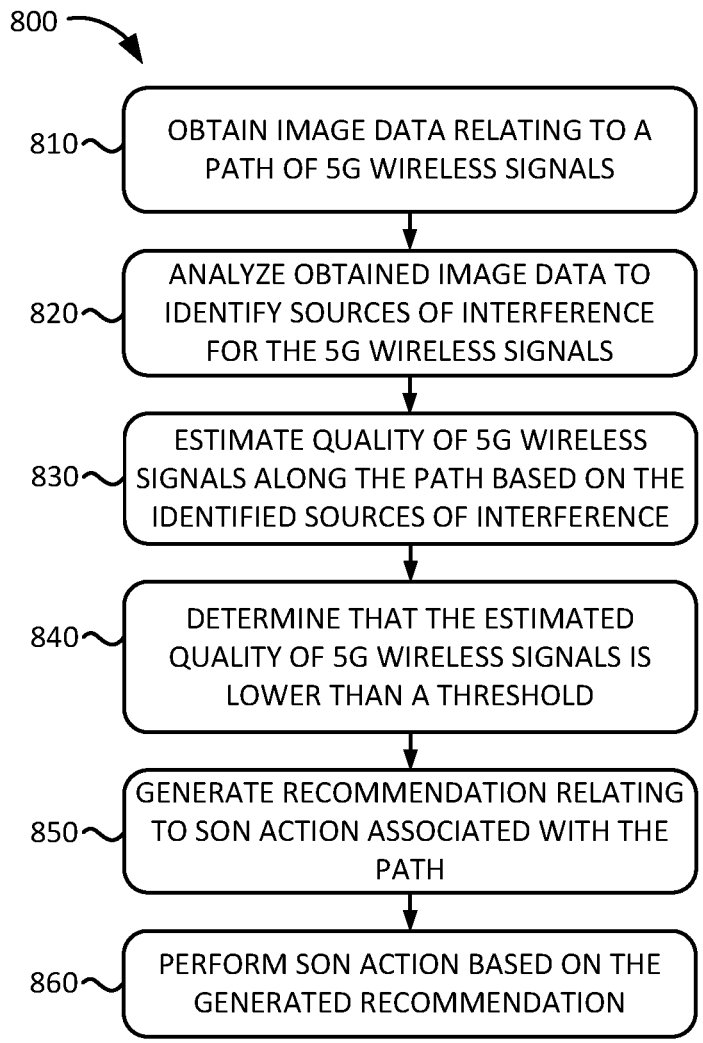
FIG. 8 is a flowchart of a process for using image data to generate a self-organizing network (SON) recommendation according to an implementation described herein.

FIG. 8 is a flowchart of a process for using image data to generate a SON recommendation according to an implementation described herein. In some implementations, the process of FIG. 8 may be performed by 5G modeling system 150. In other implementations, some or all of the process of FIG. 8 may be performed by another device or a group of devices separate from 5G modeling system 150.

The process of FIG. 8 may include obtaining image data relating to a path of 5G wireless signals (block 810). As an example, overhead image aggregator 510 may obtain satellite images of an area that includes base station 130 from a mapping service. As another example, camera 220 may capture LOS images associated with a signal path. The obtained image data may be analyzed to identify sources of interference for the 5G wireless signals (block 820) and the quality of 5G wireless signals along the path may be estimated based on identified sources of interference (block 830). For example, modeling manager 540 may use the obtained image data to identify sources of interference for particular signal paths. With respect to an overhead image, modeling manager 540 may trace a signal path from a location of base station 130 in the image towards the periphery of the image at a particular azimuth reading and may determine whether the traced signal path meets any sources of interference identified by overhead interference ML model 542. Modeling manager 540 may trace multiple signal paths in the overhead image, such as, for example, tracing a signal path at every 5°, every 10°, etc.

With respect to a LOS image, modeling manager 540 may also select multiple signal paths by selecting an azimuth value and an elevation value, identifying a location in the LOS image corresponding to the selected azimuth value and elevation value, and determine whether any sources of interference were identified at the identified location in the LOS image. Modeling manager 540 may then calculate the estimated signal strength along the path based on the identified sources of interference.

A determination may be made that the estimated quality of 5G wireless signals is lower than a threshold (block 840) and a recommendation relating to a SON action associated with the path may be generated (block 850). For example, SON recommendation manager 570 may determine that the estimated 5G signal quality is lower than a signal quality threshold and may send a recommendation to SON system 160 to recommend the path for a SON action. The path may be identified to SON system 160 by, for example, sets of GPS coordinates, by base station 130 and azimuth and elevation values, and/or using another technique.

The SON action may be performed based on the generated recommendation (block 860). For example, SON system 160 may select a particular SON action in an attempt to improve the signal quality in the area associated with the path of 5G wireless signals. SON system 160 may select to move an antenna beam in a particular direction to avoid a particular interference source (e.g., a tree, etc.) by adjusting one or more antenna tilt parameters, select to increase the transmit power of an antenna beam by adjusting one or more power distribution parameters, select to increase the likelihood that a 5G NR connection associated with the path be handed over to a different channel or band (e.g., an LTE band) by adjusting one or more handover parameters, load balancing parameters, and/or coverage optimization parameters, and/or select another SON action. SON system 160 may then send an instruction to base station 130 to perform the adjustments associated with the selected SON action.

Figure 9:
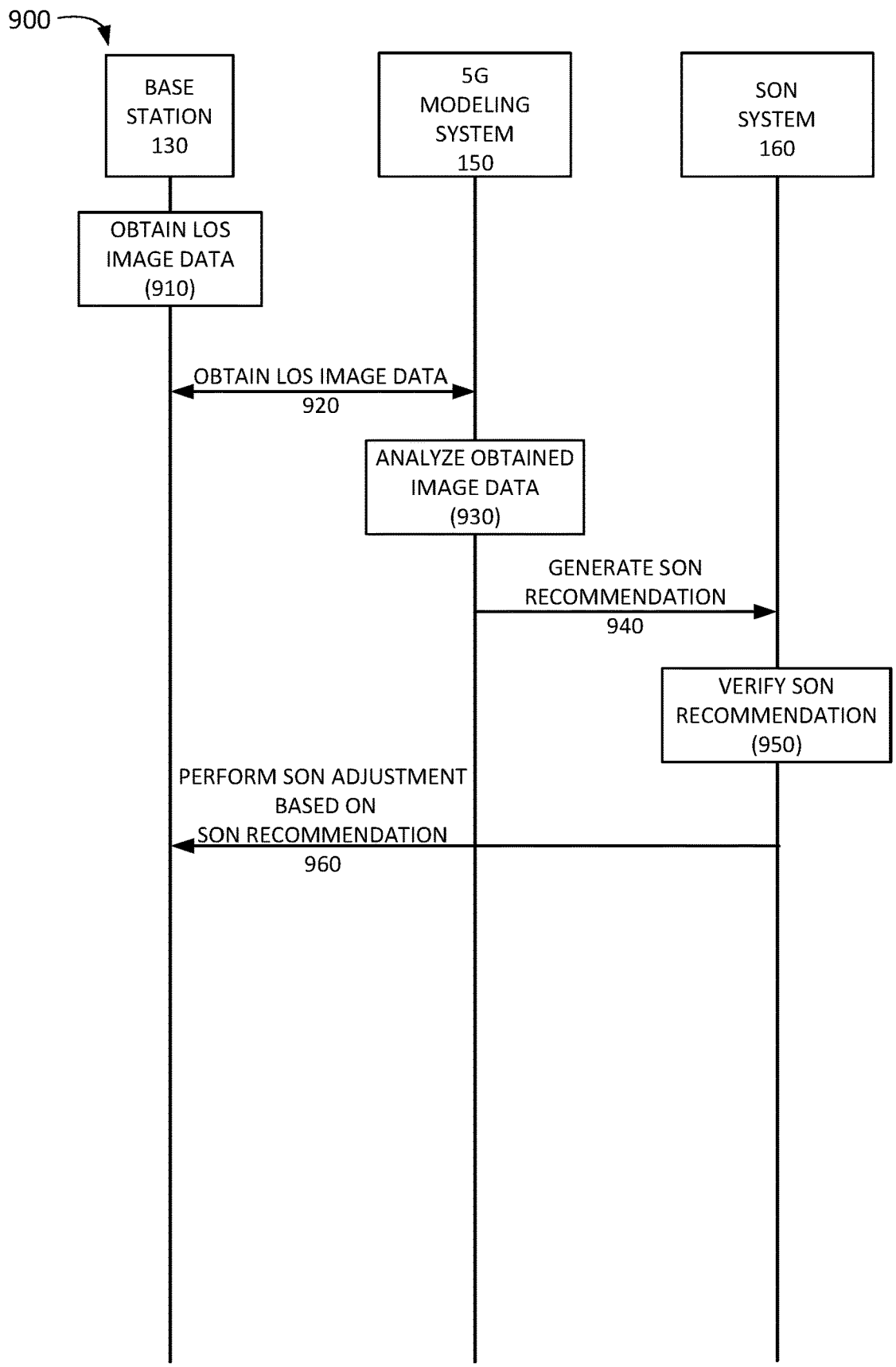
FIG. 9 is an exemplary signal flow diagram associated with an implementation described herein.

FIG. 9 is a diagram of an exemplary signal flow 900 according to an implementation described herein. As shown in FIG. 9, signal flow 900 may include base station 130 obtaining LOS image data (block 910). For example, camera 220 may capture an image along the path of an antenna beam generated by antenna array 210 and may store the captured image in image data DB 430. 5G modeling system may then obtain the LOS image data (signal 920) by accessing image data DB 430. 5G modeling system 150 may analyze the obtained image data (block 930) to identify sources of interference for 5G wireless signals and estimate 5G wireless signal quality based on the sources of interference.

5G modeling system 150 may generate a SON recommendation based on the analysis, such as by recommending that an antenna beam be moved in a particular direction to avoid a particular interference source (e.g., a tree, etc.), by recommending that a power to a particular beam be increased to address a particular interference source (e.g., rain, etc.), and/or by making another type of recommendation. 5G modeling system 150 may send the generated SON recommendation to SON system 160 (signal 940).

SON system 160 may verify the SON recommendation (block 950). For example, SON system 160 may calculate whether the recommended SON action is estimated to improve the performance of access network 120 based on one or more Key Performance Indicators (KPIs) associated with access network 120. If SON system 160 verified that the recommended SON action is desirable, SON system 160 may instruct base station 130 to perform the SON adjustment based on the SON recommendation (signal 960). For example, SON system 160 may instruct base station 130 to adjust antenna array 210 by moving a particular beam in a particular direction to avoid a source of interference, to optimize a list of neighboring base stations 130, to change an inter-Radio Access Technology (RAT) handover parameter, to change an intra-RAT handover parameter, to adjust a transmission power, and/or to perform another type of SON adjustment.

Figure 10:
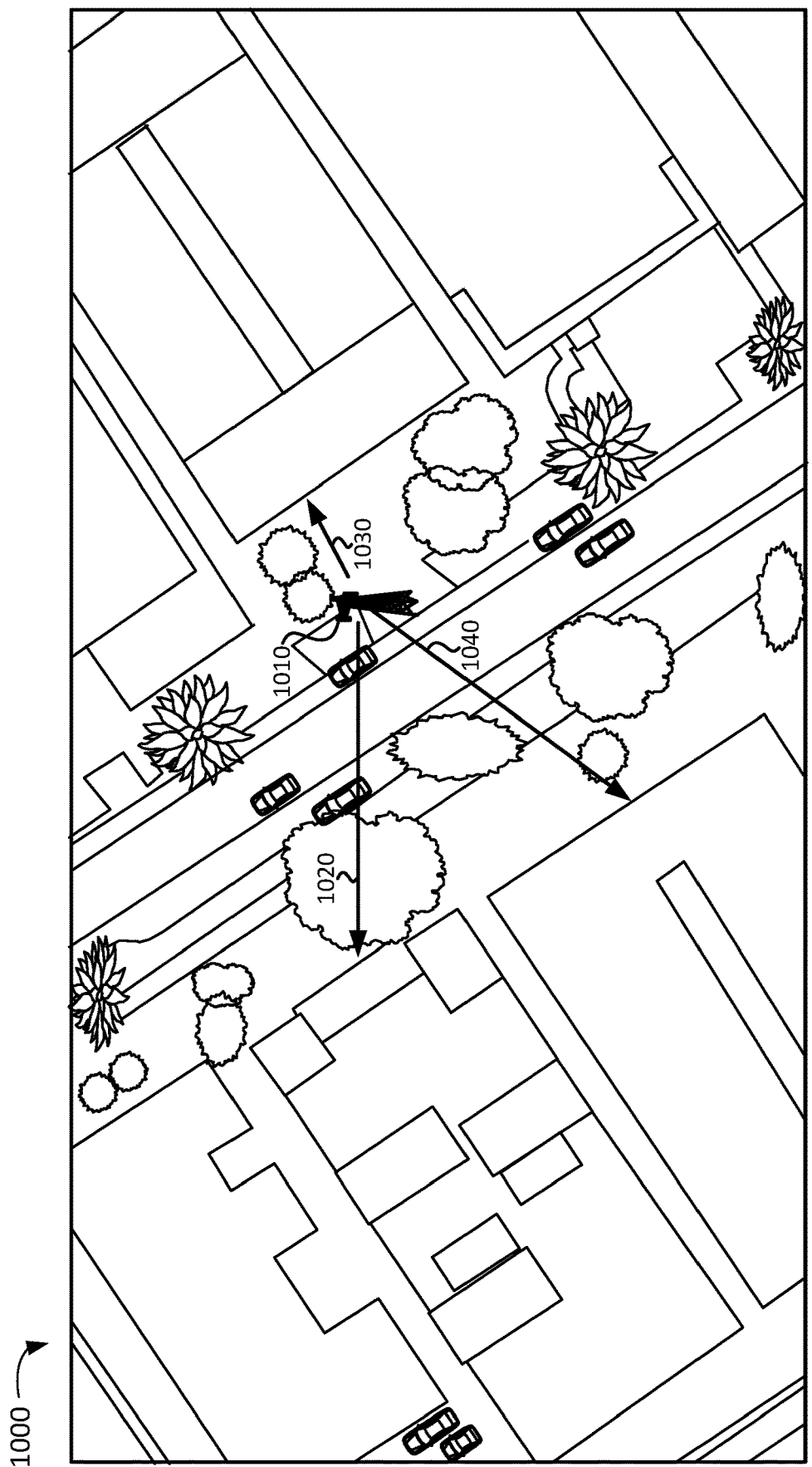
FIG. 10 illustrates an exemplary overhead image according to an implementation described herein.

FIG. 10 is a diagram illustrating an exemplary overhead image 1000 according to an implementation described herein. Overhead image 1000 may include a satellite image of a street that includes base station 130 and may include an image 1030 of base station 130. Modeling manager 540 may identify sources of interference for signal paths associated with base station 130. For example, modeling manager 540 may identify that a large tree is blocking signal path 1020, that signal path 1040 is relatively clear, and that signal path 1030 encounters a building wall with no windows.

Thus, provisioning recommendation manager 550 may recommend signal path 1040 for 5G wireless service and may recommend that signal paths 1020 and 1030 are estimated to provide inadequate 5G signal quality. Provisioning system 170 may identify customers associated with signal path 1030 (e.g., based on the address of the building to which signal path 1040 points) and may recommend to the identified customers to subscribe to 5G wireless service.

Figure 11:
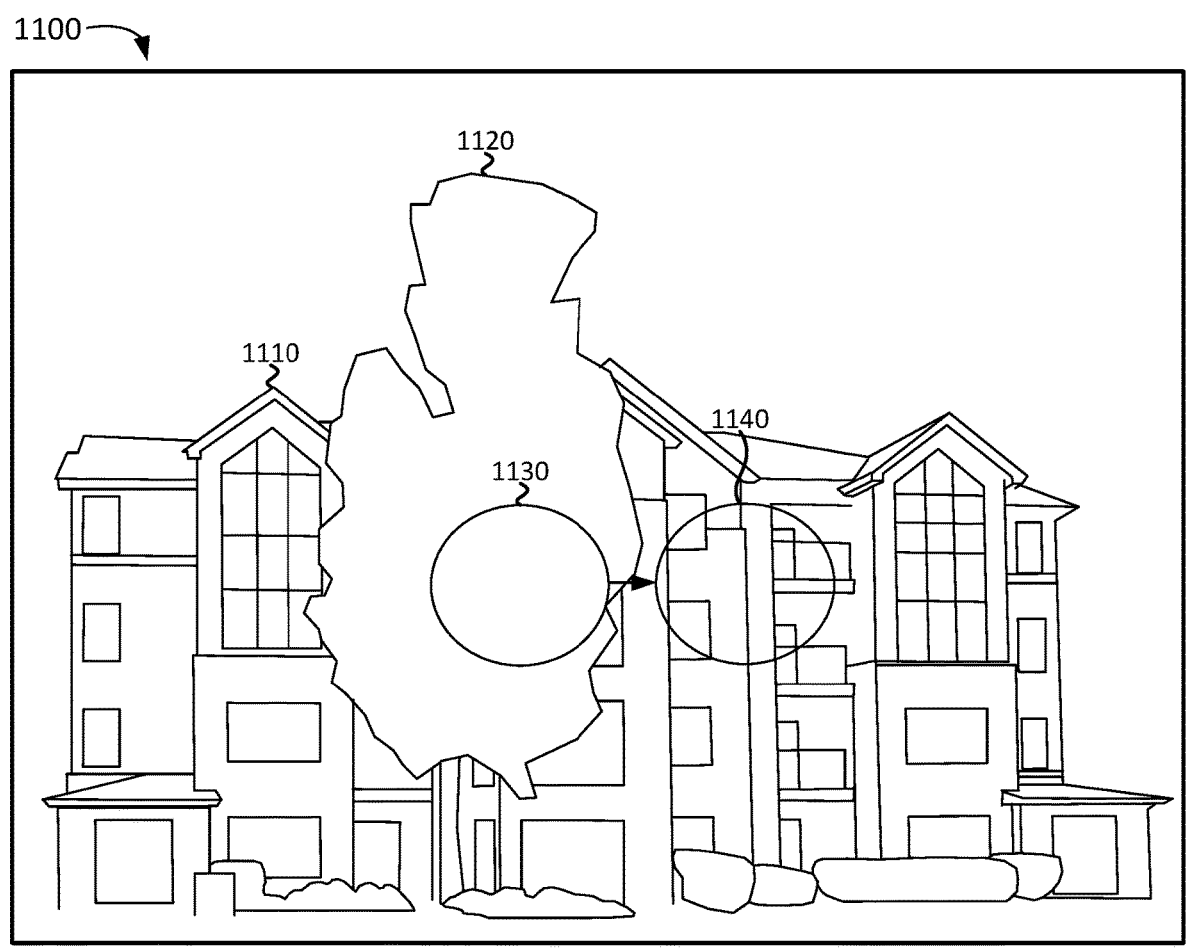
FIG. 11 illustrates a first exemplary line of sight image according to an implementation described herein.

FIG. 11 is a diagram illustrating a first exemplary LOS image 1100 according to an implementation described herein. As shown in FIG. 11, LOS image 1100 may include an apartment building 1110 and a tree 1120. Modeling manager 540 may, after running image 1100 through LOS interference machine learning model 546, identify tree 1120 as a source of interference. In response, SON recommendation manager 570 may recommend that antenna beam direction 1130 be horizontally adjusted to antenna beam direction 1140.

Figure 12:
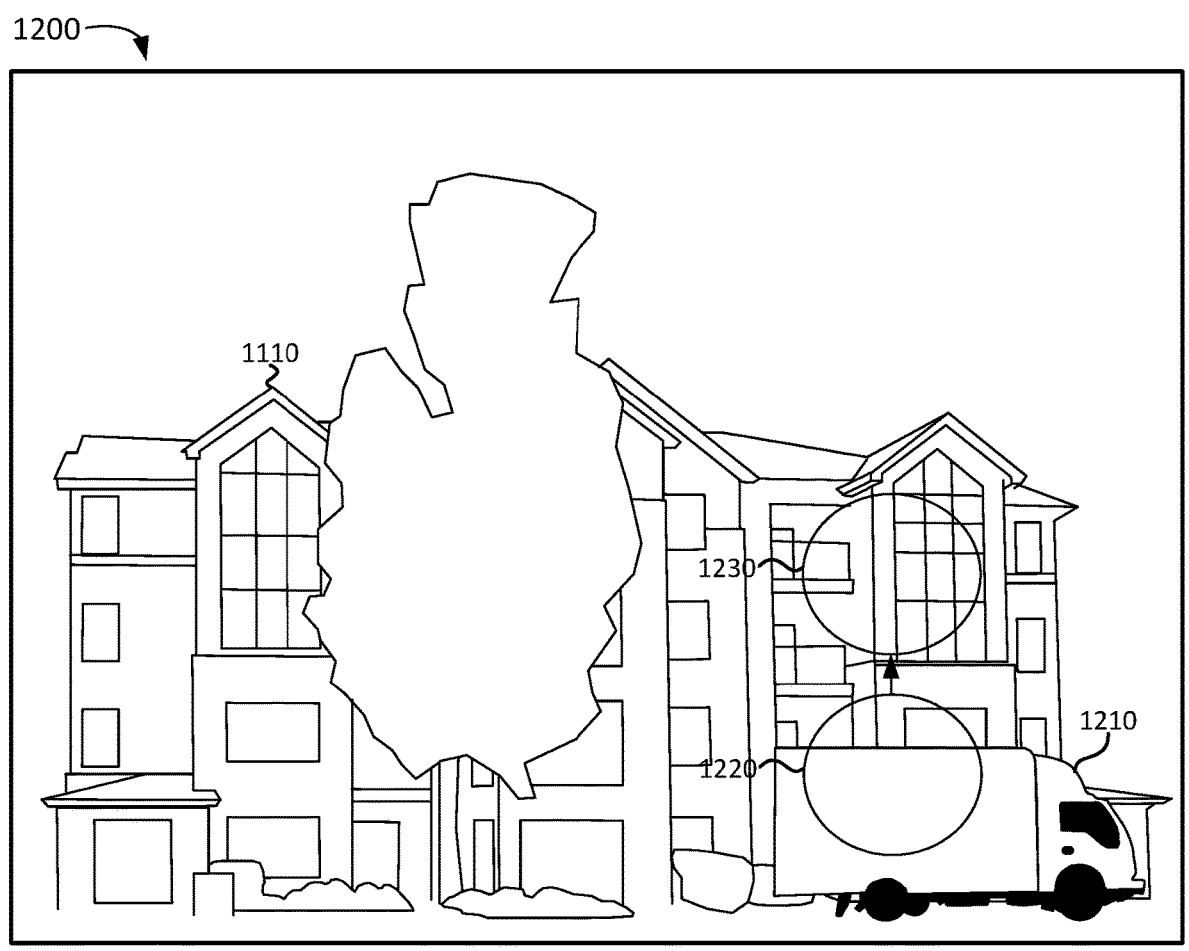
FIG. 12 illustrates a second exemplary line of sight image according to an implementation described herein.

FIG. 12 is a diagram illustrating a second exemplary LOS image 1200 according to an implementation described herein. FIG. 12 illustrates a dynamic SON recommendation that may be generated in real-time or near real-time. Assume a truck 1210 parks in front of apartment building 1110. Modeling manager 540 may, after running image 1200 through LOS interference machine learning model 546, identify truck 1210 as a source of interference. In response, SON recommendation manager 570 may recommend that antenna beam direction 1220 be vertically adjusted to antenna beam direction 1230.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signal flows has been described with respect to FIG. 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Collection, storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
obtaining, by a computer system, an image of an environment that includes a signal path of Fifth Generation (5G) New Radio (NR) wireless signals sent or received by a base station;
analyzing, by the computer system, the obtained image to identify sources of interference for the 5G NR wireless signals in the environment along the signal path;
estimating, by the computer system, a quality of the 5G NR wireless signals along the signal path based on the identified sources of interference;
determining, by the computer system, that the estimated quality of the 5G NR wireless signals is less than a quality threshold;
generating, by the computer system, a recommendation for a self-organizing network (SON) action relating to the base station, based on determining that the estimated quality of the 5G NR wireless signals is less than the quality threshold; and
performing the SON action relating to the base station based on the generated recommendation.

2. The method of claim 1, wherein the image includes an overhead image of an area that includes the base station.

3. The method of claim 1, wherein the image is obtained using a camera mounted on an antenna array associated with the base station.

4. The method of claim 3, wherein the image is obtained while the camera is aligned with an antenna beam associated with the antenna array.

5. The method of claim 1, wherein analyzing the obtained image to identify sources of interference for the 5G NR wireless signals in the environment along the signal path includes:
using a machine learning model trained to identify sources of interference for the 5G NR wireless signals in images.

6. The method of claim 5, wherein the sources of interference for the 5G NR wireless signals include one or more of:
buildings,
walls,
structures,
foliage,
vehicles, or
precipitation.

7. The method of claim 5, wherein the machine learning model is further trained to identify windows in buildings included in the obtained image.

8. The method of claim 1, wherein the SON action relating to the base station includes one or more of:
adjusting one or more antenna tilt parameters,
adjusting one or more handover parameters,
adjusting one or more coverage optimization parameters,
adjusting one or more power distribution parameters, or
adjusting one or more load balancing parameters.

9. The method of claim 1, further comprising:
obtaining another image relating to another signal path of 5G NR wireless signals sent or received by the base station;
analyzing the obtained other image to identify other sources of interference for the 5G NR wireless signals;
estimating another quality of the 5G NR wireless signals along the other signal path based on the identified other sources of interference; and
generating a recommendation to a provisioning network based on the estimated other quality of the 5G NR wireless signals along the other signal path.

10. The method of claim 9, wherein the generated recommendation to the provisioning network includes information identifying whether a customer location along the other signal path of 5G NR wireless signals should be provisioned for 5G NR wireless service.

11. The method of claim 9, further comprising:
identifying a dwelling unit associated with the other signal path based on the image.

12. A computer system comprising:
a memory storing instructions; and
processor configured to execute the instructions to:
obtain an image of an environment that includes a signal path of Fifth Generation (5G) New Radio (NR) wireless signals sent or received by a base station;
analyze the obtained image to identify sources of interference for the 5G NR wireless signals in the environment along the signal path;
estimate a quality of the 5G NR wireless signals along the signal path based on the identified sources of interference;
determine that the estimated quality of the 5G NR wireless signals is less than a quality threshold;
generate a recommendation for a self-organizing network (SON) action relating to the base station, based on determining that the estimated quality of the 5G NR wireless signals is less than the quality threshold; and
perform the SON action relating to the base station based on the generated recommendation.

13. The computer system of claim 12, wherein the image includes overhead image of an area that includes the base station.

14. The computer system of claim 12, wherein the image is obtained using a camera mounted on an antenna array associated with the base station.

15. The computer system of claim 12, wherein, when analyzing the obtained image to identify sources of interference for the 5G NR wireless signals in the environment along the signal path, the processor is further configured to:
use a machine learning model trained to identify sources of interference for the 5G NR wireless signals in images.

16. The computer system of claim 12, wherein the sources of interference for the 5G NR wireless signals include one or more of:
buildings,
walls,
structures,
foliage,
vehicles, or
precipitation.

17. The computer system of claim 12, wherein the SON action relating to the base station includes one or more of:
adjusting one or more antenna tilt parameters,
adjusting one or more handover parameters,
adjusting one or more coverage optimization parameters,
adjusting one or more power distribution parameters, or
adjusting one or more load balancing parameters.

18. The computer system of claim 12, wherein the processor is further configured to:

obtain another image relating to another signal path of 5G NR wireless signals sent or received by the base station;

analyze the obtained other image to identify other sources of interference for the 5G NR wireless signals;

estimate another quality of the 5G NR wireless signals along the other signal path based on the identified other sources of interference; and generate a recommendation to a provisioning network based on the estimated other quality of the 5G NR wireless signals along the other signal path.

19. The computer system of claim 12, wherein the generated recommendation to the provisioning network includes information identifying whether a customer associated with the other signal path of 5G NR wireless signals should be provisioned for 5G NR wireless service.

20. A system comprising:

a base station comprising:

an antenna array configured to send and receive Fifth Generation (5G) New Radio (NR) wireless signals; and a camera coupled to the antenna array and configured to align in a particular direction associated with the antenna array; and a computer device configured to:

obtain, from the camera, an image of an environment that includes a signal path of Fifth Generation (5G) wireless signals sent or received by a base station;

analyze the obtained image to identify sources of interference for the 5G NR wireless signals in the environment along the signal path;

estimate a quality of the 5G NR wireless signals along the signal path based on the identified sources of interference;

determine that the estimated quality of the 5G NR wireless signals is less than a quality threshold;

generate a recommendation for a self-organizing network (SON) action relating to the base station, based on determining that the estimated quality of the 5G NR wireless signals is less than the quality threshold; and perform the SON action relating to the base station based on the generated recommendation.

* * * * *